(12) United States Patent
Laws et al.

(10) Patent No.: US 8,362,359 B1
(45) Date of Patent: Jan. 29, 2013

(54) SURFACE MODIFIED DROP CABLE, METHOD OF MAKING SAME, AND DROP CABLE ASSEMBLY

(75) Inventors: Jeffrey Scott Laws, Brownwood, TX (US); Scott Howard Larose, Brownwood, TX (US)

(73) Assignee: Superior Essex Communications LP, Atlanta, GA (US)

( * ) Notice: Subject to any disclaimer, the term of this patent is extended or adjusted under 35 U.S.C. 154(b) by 295 days.

(21) Appl. No.: 12/509,798

(22) Filed: Jul. 27, 2009

(51) Int. Cl.
*H01B 7/08* (2006.01)
(52) U.S. Cl. .................................. 174/117 F; 385/114
(58) Field of Classification Search .............. 174/110 R, 174/117 F, 117 FF; 385/114
See application file for complete search history.

(56) References Cited

U.S. PATENT DOCUMENTS

| | | | |
|---|---|---|---|
| 3,287,490 A | 11/1966 | Wright | |
| 3,728,424 A * | 4/1973 | Bauer | 264/40.6 |
| 3,902,552 A | 9/1975 | McLain | |
| 4,205,899 A | 6/1980 | King et al. | |
| 4,341,923 A * | 7/1982 | Allen | 174/117 R |
| 4,505,541 A * | 3/1985 | Considine et al. | 385/107 |
| 4,740,658 A * | 4/1988 | Hoffman et al. | 174/103 |
| 4,976,519 A | 12/1990 | Davey et al. | |
| 5,038,834 A | 8/1991 | Siegfried | |
| 5,042,904 A | 8/1991 | Story et al. | |
| 5,466,011 A | 11/1995 | Cohn | |
| 5,508,475 A * | 4/1996 | Profiri et al. | 174/74 R |
| 5,901,923 A * | 5/1999 | Duden et al. | 244/3.16 |
| 6,012,742 A | 1/2000 | Kocian et al. | |
| 6,017,244 A * | 1/2000 | Daane | 439/495 |
| 6,243,519 B1 | 6/2001 | Ishikawa et al. | |
| 6,581,251 B2 | 6/2003 | Malin | |
| 6,610,931 B2 | 8/2003 | Perelman et al. | |
| 6,621,006 B2 * | 9/2003 | Smith | 174/93 |
| 6,661,956 B2 | 12/2003 | Yamasaki et al. | |
| 6,732,981 B2 | 5/2004 | Franks et al. | |
| 6,778,744 B2 | 8/2004 | Norris et al. | |
| 6,825,418 B1 | 11/2004 | Dollins et al. | |
| 7,123,801 B2 | 10/2006 | Fitz | |
| 7,234,669 B2 | 6/2007 | Franks, Jr. | |
| 7,272,282 B1 * | 9/2007 | Seddon et al. | 385/106 |
| 7,367,534 B2 | 5/2008 | Franks, Jr. | |
| 2004/0063812 A1 | 4/2004 | Sohal | |
| 2006/0016615 A1 * | 1/2006 | Schilson et al. | 174/117 F |
| 2006/0029776 A1 | 2/2006 | Wang | |
| 2007/0133932 A1 * | 6/2007 | Kingsford et al. | 385/114 |
| 2008/0121854 A1 | 5/2008 | Kochan | |
| 2008/0212927 A1 | 9/2008 | Pavan et al. | |

* cited by examiner

*Primary Examiner* — Chau Nguyen

(57) ABSTRACT

A drop cable supportable in a drop cable clamping assembly includes a conductive, non-conductive, or combination conductive and non-conductive core enclosed by an extruded cable jacket of thermoplastic material. The cable jacket has a flattened top surface and a flattened bottom surface, either or both of which is provided with a friction engaging surface consisting of indentations or projections formed by one or more rollers following extrusion of the cable jacket and operatively configured for engagement by a clamping surface of the clamping assembly.

6 Claims, 4 Drawing Sheets

SURFACE MODIFIED DROP CABLE, METHOD OF MAKING SAME, AND DROP CABLE ASSEMBLY

FIELD OF THE INVENTION

The present invention relates generally to drop cables and more particularly to drop cables having an outer jacket surface modified with a mechanical alteration that increases the surface friction of the outer jacket.

BACKGROUND

Various types of clamps are employed to suspend and direct cables extending between supports and/or structures, such as between utility poles and/or between a utility pole and a building. One such type of clamp, commonly referred to as a drop wire clamp or drop cable clamp, is used to support and attach a cable to a building, pole, or support wire. The drop wire clamp supports the weight of the cable and maintains tension on the cable, while lessening or largely eliminating stress on the attachment points of the cable.

A currently employed type of drop wire clamp, also known as a wedge style compression-type drop wire clamp, includes an elongate shell or housing with a bottom and tapering sides, a mating slide assembly with a hanger loop, and a shim member disposed between the bottom of the housing and the slide assembly. The cable is held within the clamp between the bottom of the housing and the shim through compressive force or pressure applied by moving the slide assembly within the housing between the tapering sides. When the hanger loop of the slide assembly is attached to a pole, it exerts a pulling force on the slide assembly within the housing which causes a compressive force to be exerted on the cable disposed between the shim and the housing bottom. Examples of such wedge style compression-type drop wire clamps are known from U.S. Pat. No. 6,581,251 (Malin); U.S. Pat. No. 6,732,981 (Franks et al.); and U.S. Pat. No. 7,234,669 (Franks, Jr.).

Cable manufacturers go to great pains to produce cable with an outer jacket that is as nearly perfectly smooth and blemish free as is possible, and various factors, such as mechanical and thermal effects, allow the cable with its smooth outer jacket to move and slip within such wedge style installation clamps. The smoother the cable jacket, the greater the clamping pressure needed to reduce the degree of cable slippage in typical wedge style installation clamps. In turn, the greater the clamping pressure, the more likely it is that certain types of cables, such as fiber optic-based cables, will be damaged by the clamping pressure exerted on the cable.

In the past, the issue of cable slippage in wedge style installation clamps has been addressed exclusively from the clamp side with a variety of clamping designs in an attempt to achieve a tight clamping environment for the smooth surface cable. Thus, different styles of wedge clamps and clamp plates have been introduced to reduce the cable slippage, and it has been suggested, e.g., to include a plurality of ribs, holes, or a grate-like surface in a compression portion of the clamp, or to add an abrasive coating, such as an enamel and crushed glass mixture, to the clamping portion of the clamp. An example of such an attempt to address the issue of cable slippage exclusively from the clamp side is the drop wire clamp proposed in U.S. Pat. No. 7,367,534 (Franks, Jr.). However, slippage of the type of smooth-surfaced cable currently produced occurs even in such wedge type drop wire clamps with ribs, holes, grate-like surfaces or abrasive coatings.

It has also been suggested that ice loading of aerial cable might be reduced or that wind performance might be improved by providing a spiral shape to the rounded surface of the outer jacket of cable having a generally rounded cross section, but such a spiral configuration does not provide a significant increase in the friction properties of the cable jacket. Indeed, the presumed improvement in wind performance suggests a reduction in the friction properties of the cable jacket.

Field related installation issues of movement and slippage of cable within wedge style installation clamps remain common with drop cables.

SUMMARY

The drop cable for embodiments of the invention is supportable in a known type of drop cable clamping assembly and includes a non-conductive or conductive core, such as a fiber optic core containing one or more optical fibers or a copper core, or a combination conductive and non-conductive core, enclosed by an extruded cable jacket of thermoplastic material, such as polyethylene or polyvinyl chloride. The cable jacket has a flattened top surface and a flattened bottom surface, either or both of which is provided with a friction engaging surface operatively configured for engagement by a clamping surface of the clamping assembly. Embodiments of the invention include cable having all types of conductive, non-conductive, and combination conductive and non-conductive cores and a cable jacket of any suitable thermoplastic material.

According to embodiments of the invention, the friction engaging surface provided on either or both of the flattened top surface and flattened bottom surface of the cable jacket consists of a plurality of imprinted or impressed indentations. The indentations can consist of a plurality of straight lines that define, for example, a diamond-shaped knurl pattern, perpendicular lines, a cross-hatched pattern, or longitudinal lines. In addition, the indentations can consist of a plurality of curved lines or a combination of a plurality of straight and curved lines.

Further, the plurality of indentations can define one or more of regular, irregular, random, or pseudorandom patterns, or a combination of regular, irregular, random, and pseudorandom patterns and can be imprinted or impressed continuously or intermittently on either or both of the flattened top surface and flattened bottom surface of the cable jacket. Additionally, the plurality of indentations can be imprinted or impressed on a pre-determined periodic, random, or pseudo-random basis on either or both of the flattened top surface and flattened bottom surface of the cable jacket.

Embodiments of the invention also include, for example, a process of making the drop cable that is supportable in the clamping assembly that involves, for example, positioning a non-conductive or conductive core, such as a fiber optic or a copper core, or a combination conductive and non-conductive core, within an extrusion tip, and extruding in a known way a cable jacket of thermoplastic material, such as polyethylene or polyvinyl chloride, at a predetermined extrusion temperature around the core, which cable jacket has a flattened top surface and a flattened bottom surface. Thereafter, according to embodiments of the invention, either or both of the flattened top surface and flattened bottom surface of the thermoplastic material of the extruded cable jacket is provided with a friction engaging surface that is operatively configured for engagement by a clamping surface of the clamping assembly, and the thermoplastic material of the extruded cable jacket is allowed to return to an ambient temperature.

The friction engaging surface for embodiments of the invention is provided by imprinting or impressing a plurality of indentations on either or both of the flattened top surface and flattened bottom surface of the thermoplastic material of the extruded cable jacket, for example, by one or more rollers or a series of rollers in physical contact with the thermoplastic material after cooling slightly to a temperature that is less than the extrusion temperature of the thermoplastic material but at a sufficiently elevated temperature that the thermoplastic material remains in a softened state suitable for imprinting or impressing the indentations.

In addition, embodiments of the invention propose a drop cable assembly that utilizes, for example, a known type of drop clamp, such as a wedge style compression type drop wire clamp, having one or more clamping surfaces with drop cable that includes a non-conductive or conductive core, such as a fiber optic or copper core, or a combination conductive and non-conductive core, enclosed by an extruded cable jacket of thermoplastic material, such as polyethylene or polyvinyl chloride. The cable jacket has a flattened top surface and a flattened bottom surface, either or both of which is provided with a friction engaging surface that is engaged by one or more of the clamping surfaces of the drop clamp, which can likewise be provided with a friction engaging surface.

Further, the friction engaging surface provided on either or both of the flattened top surface and flattened bottom surface of the cable jacket can consist of a plurality of imprinted or impressed indentations, and the friction engaging surface or surfaces of the drop clamp can consist of a plurality of ridges formed on the friction engaging surface that engage the indentations imprinted on one or both of the flattened top surface and flattened bottom surface of the cable jacket.

The discussion of surface modified drop cable presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
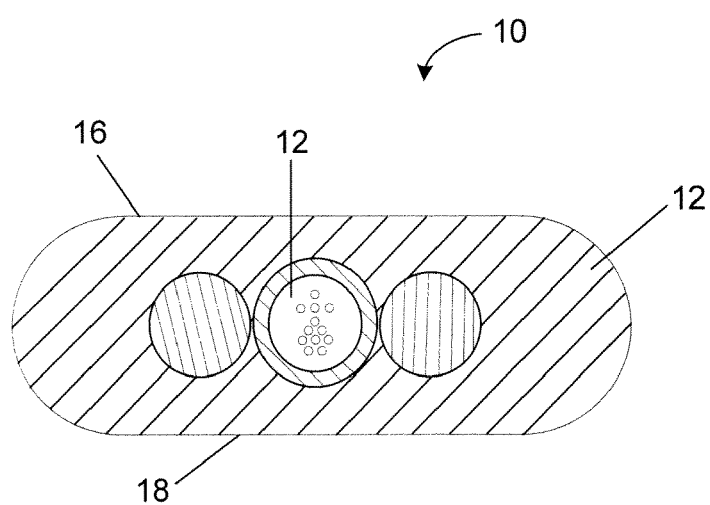
FIG. 1 illustrates a cross sectional view of an example of cable for embodiments of the invention supportable in a known type of drop cable clamping assembly.

Many aspects of the invention can be better understood with reference to the above drawings. The elements and features shown in the drawings are not to scale, emphasis instead being placed upon clearly illustrating the principles of exemplary embodiments of the present invention. Moreover, certain dimension may be exaggerated to help visually convey such principles. In the drawings, reference numerals designate like or corresponding, but not necessarily identical, elements throughout the several views.

DETAILED DESCRIPTION OF EXEMPLARY EMBODIMENTS

Embodiments of the invention propose a drop cable having a modified outer jacket surface, e.g., by mechanically altering the exterior of the outer jacket of the drop cable to increase the surface friction between the jacket and the wedge style type of installation clamps that clamp the exterior surface or jacket of the cable and to maximize the cable-to-clamp grip adhesion and to reduce field related problems.

In embodiments of the invention, standard manufacturing processes are employed to produce a conductive, non-conductive, or combination conductive and non-conductive core enclosed by an extruded outer jacket of thermoplastic material, such as polyethylene or polyvinyl chloride. Embodiments of the invention employ, e.g., a series of rollers which physically contact the outer jacketing of the cable product immediately after the jacketing line extrusion crosshead. The rolling surfaces of the rollers are embossed, for example, with ridges or projections which imprint or impress a pattern or patterns into the cable jacket.

FIG. 1 illustrates a cross sectional view of an example of cable for embodiments of the invention supportable in a known type of drop cable clamping assembly. Referring to FIG. 1, the drop cable 10 for embodiments of the invention includes a non-conductive or conductive core 12, such as a fiber optic or copper core, or a combination conductive and non-conductive core, enclosed by an extruded cable jacket 14 of thermoplastic material, such as polyethylene or polyvinyl chloride. The cable jacket 14 has a flattened top surface 16 and a flattened bottom surface 18, either or both of which is provided with a friction engaging surface operatively configured for engagement by a clamping surface of the clamping assembly. It is to be understood that embodiments of the invention include cable having all types of conductive, non-conductive, and combination conductive and non-conductive cores including, without limitation, copper and/or fiber optic cores and a cable jacket of any suitable thermoplastic material.

The friction engaging surface for embodiments of the invention consists of an imprinted or impressed pattern or patterns which can be any shape that is suitable to increase the frictional force between the cable jacket 14 and the clamp, including without limitation, a diamond shaped knurl, cross-hatching lines, perpendicular lines, or longitudinal lines. The shapes can include straight lines or curved lines or a combination of straight and curved lines. The shapes can form one or more regular, irregular or random patterns or a combination of one or more of regular, irregular or random patterns.

Further, the imprinted or impressed patterns can be continuously imprinted or impressed or intermittently imprinted or impressed, either on a pre-determined periodic basis or on a random or pseudo-random basis. It is to be noted, that embodiments of the invention do not require a change or alteration of the physical dimensions of currently produced cable but only involve alteration of the surface of the outer jacket by adding an imprinted or impressed design, and the electrical and environmental characteristics of the cable are not affected.

According to embodiments of the invention, the design can be imprinted or impressed on one or both of the top 16 and bottom 18 of the cable outer jacket 14 and can be continuously or intermittently imprinted or impressed on one or both of the top 16 and bottom 18 of the cable outer jacket 14. Further, different designs can be imprinted or impressed on the top 16 and bottom 18 of the cable outer jacket 14 and the designs can be continuously imprinted or impressed or on one of the top 16 and bottom 18 of the cable outer jacket 14 and intermittently imprinted or impressed on the other of the top 16 and bottom 18 of the cable outer jacket 14.

Figure 2:
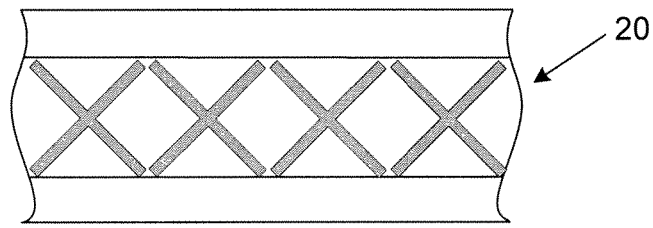
FIGS. 2-6 illustrate examples of friction engaging surfaces provided on either or both of the flattened top surface and flattened bottom surface of the cable jacket.
Figure 3:
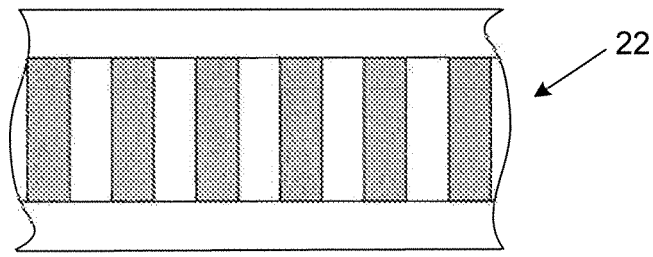
Figure 4:
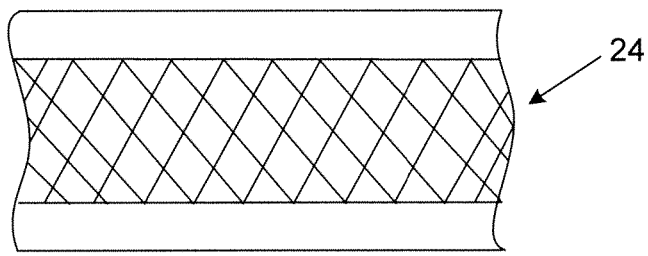
Figure 5:
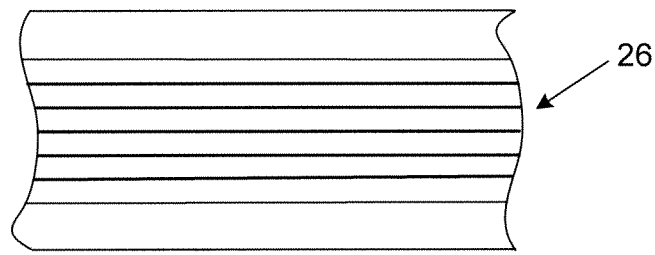
Figure 6:
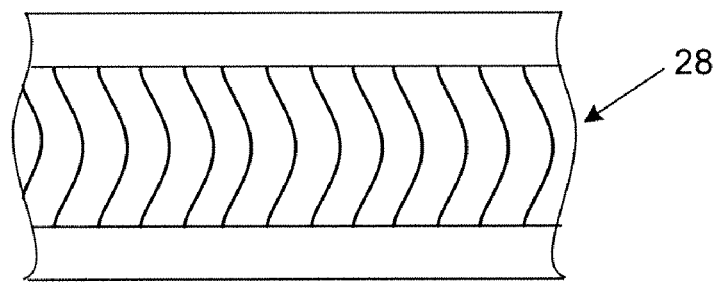

FIGS. 2-6 illustrate examples of friction engaging surfaces provided on either or both of the flattened top surface and flattened bottom surface of the cable jacket. According to embodiments of the invention, the friction engaging surface provided on either or both of the flattened top surface 16 and flattened bottom surface 18 of the cable jacket 14 consists of a plurality of imprinted or impressed indentations. The indentations can consist of a plurality of straight lines that define, for example, a diamond-shaped knurl pattern 20 as shown in FIG. 2, perpendicular lines 22 as shown in FIG. 3, a cross-hatched pattern 24 as shown in FIG. 4, or longitudinal lines 26 as shown in FIG. 5. In addition, the indentations can consist of a plurality of curved lines 28 as shown in FIG. 6 or any combination of a plurality of straight and curved lines.

Further, the plurality of indentations can define one or more of regular, irregular, random, or pseudorandom patterns, or any combination of regular, irregular, random, and pseudorandom patterns and can be imprinted or impressed continuously or intermittently on either or both of the flattened top surface 16 and the flattened bottom surface 18 of the cable jacket 14. Additionally, the plurality of indentations can be imprinted or impressed continuously or impressed on a predetermined periodic, random, or pseudo-random basis on either or both of the flattened top surface 16 and flattened bottom surface 18 of the cable jacket 14.

Embodiments of the invention involve imprinting, impressing, or stamping a characteristic design into the outer jacket 14 of the cable 10 as opposed to removing portions of the surface of the jacket 14. Thus, embodiments of the invention employ a rolling wheel mechanism to imprint of impress the design immediately after the outer jacket 14 is extruded and, if necessary, after allowing the jacket material to cool slightly to an optimal temperature for the imprinting or impressing.

In embodiments of the invention, the design is imprinted or impressed on the cable jacket 14 just after extrusion of the polyethylene or polyvinyl chloride jacket during the cooling process of the jacket material. At that point, while the thermoplastic jacket material is at an elevated temperature at which it is in a suitably softened state, one or more rollers physically contact the jacketing material and imprint or impress the pattern or patterns into the cable jacket 14.

Figure 7:
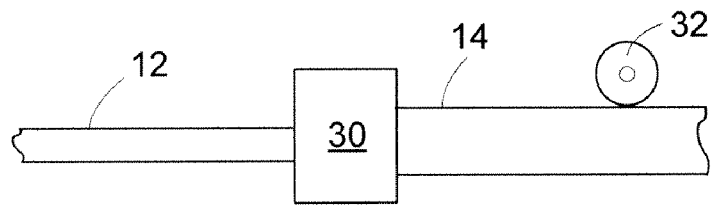
FIG. 7 is a schematic diagram that illustrates an example of components employed in the process of making the drop cable supportable in the clamping assembly for embodiments of the invention.

FIG. 7 is a schematic diagram that illustrates an example of components employed in the process of making the drop cable supportable in the clamping assembly for embodiments of the invention. Referring to FIG. 7, such components include, for example, an extrusion tip 30 within which the core 12 is received and at which the cable jacket 14 is extruded around the core 30, and a roller 32 which imprints or impresses the plurality of indentations on either or both of the flattened top surface 16 and flattened bottom surface 18 of the thermoplastic material of the extruded cable jacket 14.

Figure 8:
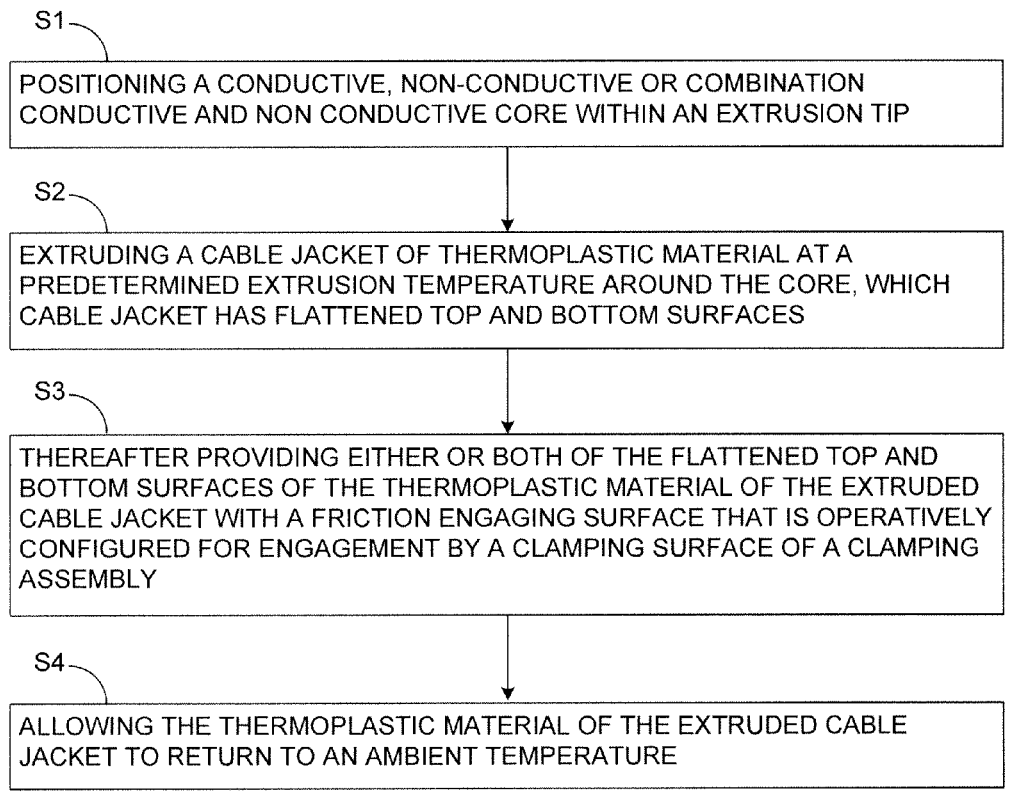
FIG. 8 is a flow chart that illustrates an example of the process of making the drop cable supportable in a clamping assembly for embodiments of the invention.

FIG. 8 is a flow chart that illustrates an example of the process of making the drop cable supportable in a clamping assembly for embodiments of the invention. Referring to FIG. 8, the process of making the drop cable for embodiments of the invention involves, for example, at S1, positioning a core 12, such as a fiber optic or a copper core, within an extrusion tip 30, and at S2, extruding a cable jacket 14 of thermoplastic material, such as polyethylene or polyvinyl chloride, at a predetermined extrusion temperature around the core 12, which cable jacket has a flattened top surface 16 and a flattened bottom surface 18. Thereafter, at S3, either or both of the flattened top surface 16 and flattened bottom surface 18 of the thermoplastic material of the extruded cable jacket 14 is provided with a friction engaging surface that is operatively configured for engagement by a clamping surface of the clamping assembly, and at S4, the thermoplastic material of the extruded cable jacket 14 is allowed to return to an ambient temperature.

According to embodiments of the invention, the friction engaging surface is provided by imprinting or impressing the plurality of indentations on either or both of the flattened top surface 16 and flattened bottom surface 18 of the thermoplastic material of the extruded cable jacket 14, for example, by one or more rollers 32 or a series of such rollers in physical contact with the thermoplastic material of the cable jacket 14 after cooling slightly to a temperature that is less than the extrusion temperature of the thermoplastic material but at a sufficiently elevated temperature that the thermoplastic material remains in a softened state suitable for imprinting or impressing the indentations by the roller 32.

It is to be noted that embodiments of the invention are not limited to impressing or indenting the pattern or patterns into the cable jacket. Alternative embodiments likewise employ, e.g., a series of rollers which physically contact the outer jacketing of the cable product immediately after the jacketing line extrusion crosshead while the thermoplastic jacket material is in a suitably softened state. However, instead of providing the cable with a friction engaging surface by impressing or indenting the pattern or patterns into the cable jacket by ridges or projections embossed or raised on the rolling surfaces of the rollers, such alternative embodiments provide the friction engaging surface by embossing or raising the pattern or patterns on the surface of the cable jacket by corresponding indentations formed in the rolling surfaces of the rollers.

It is to be further noted that embodiments of the invention are not limited to impressing or indenting the pattern or patterns into the cable jacket or embossing or raising the pattern or patterns on the surface of the cable jacket. Other alternative embodiments of the invention involve, for example, providing the cable with a friction engaging surface by mixing an abrasive material, such as an abrasive mineral material, in the thermoplastic jacket material during or before extrusion. Additional alternative embodiments involve, for example, providing the cable with a friction engaging surface by applying an abrasive material, such as an abrasive mineral material, to the outer jacketing of the cable product immediately after the jacketing line extrusion crosshead while the thermoplastic jacket material is in a suitably softened state for the abrasive material to become embedded in or adhere to the thermoplastic material. Still other alternative embodiments involve, for example, providing the cable with a friction engaging surface by applying an abrasive material, such as an abrasive mineral material, to the outer jacketing of the cable product after the jacketing line extrusion crosshead by coating or adhering the abrasive material to the cable jacket with a suitable coating or adhesive material.

In embodiments of the invention, the surface friction of the outer jacket 14 of the drop cable 10 can be modified to cooperate with modifications in the compression portion of a known wedge-type drop cable clamp in which clamping surfaces in the cable clamp are provided with grates, dimples, ridges and the like in an attempt to increase the friction between the clamp and the cable and maximize the cable-toclamp grip adhesion. For example, embodiments of the invention include a cable jacket 14 imprinted or impressed on its bottom 18 and/or top 16 surfaces with a pattern of lines perpendicular to the cable direction corresponding to a pattern of ridges likewise perpendicular to the cable direction formed on one or more clamping surfaces of the clamp.

A drop cable assembly according to embodiments of the invention includes, for example, a known type of drop clamp, such as a wedge style compression type drop wire clamp, having one or more clamping surfaces and a core 12, such as a fiber optic or copper core, enclosed by an extruded cable jacket 14 of thermoplastic material, such as polyethylene or polyvinyl chloride. The cable jacket 14 has a flattened top surface 16 and a flattened bottom surface 18 either or both of which is provided with a friction engaging surface that is engaged by one or more of the clamping surfaces of the drop clamp, which can likewise be provided with a friction engaging surface.

Further, the friction engaging surface provided on either or both of the flattened top surface 16 and flattened bottom surface 18 of the cable jacket 14 can consist of a plurality of imprinted or impressed indentations, and the friction engaging surface or surfaces of the drop clamp can consist of a plurality of ridges formed on the friction engaging surface of the drop clamp that engage the indentations imprinted on one or both of the flattened top surface 16 and flattened bottom surface 18 of the cable jacket 14.

Embodiments of the invention are applicable to fiber optic-based drop cables including, without limitation, fiber-to-the-premises tight buffered indoor/outdoor cable, aerial drop fiber-to-the-premises cable, non-metallic strength member aerial drop cable, non-metallic strength member cable, aerial drop fiber-to-the home cable made using polyethylene or polyvinyl chloride outer jackets in either an all-dielectric (i.e., with strength elements that are non-metal) or toneable (i.e., with a metallic wire or strip for detection with toning devices) configuration. It is to be noted that embodiments of the invention are not limited to fiber optic-type drop cable but encompass all types of drop cable also including, without limitation, copper-based drop cable.

Technology for a surface modified drop cable has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic drop cable supportable in a clamping assembly, comprising:
   a core comprising a plurality of optical fibers, the core enclosed by an extruded cable jacket comprising thermoplastic material, the cable jacket having a flattened top surface and a flattened bottom surface,
   at least one of the flattened top and flattened bottom surfaces comprising a friction engaging surface that is operatively configured for engagement by a clamping surface of the clamping assembly and that comprises a plurality of indentations or projections defining curved lines,
   wherein the friction engaging surface of said at least one of the flattened top and flattened bottom surfaces further comprises an abrasive material mixed or embedded in or adhered to the thermoplastic material of said at least one of the flattened top and flattened bottom surfaces.

2. The drop cable of claim 1, wherein the curved lines extend laterally with respect to a longitudinal axis of the fiber optic drop cable.

3. The drop cable of claim 1, wherein the thermoplastic material comprises one of polyethylene and polyvinyl chloride, and
   wherein the curved lines run substantially opposite the core.

4. The drop cable of claim 1, wherein the curved lines form a pattern that repeats lengthwise along the fiber optic drop cable.

5. The drop cable of claim 1, wherein the curved lines are substantially parallel to one another.

6. The drop cable of claim 1, wherein the fiber optic drop cable has a cable direction, and wherein the curved lines are substantially perpendicular to the cable direction.

* * * * *